United States Patent [19]

Edagawa et al.

[11] Patent Number: 5,246,475

[45] Date of Patent: Sep. 21, 1993

[54] METHOD FOR PREPARING A FUSED SILICA GLASS BODY CO-DOPED WITH A RARE EARTH ELEMENT AND ALUMINUM

[75] Inventors: Noboru Edagawa, Tokyo; Yoshihiro Yoshida, Saitama; Minoru Taya, Gunma; Tadakatsi Shimada, Gunma; Kazuo Koya, Gunma, all of Japan

[73] Assignees: Shin-Etsu Chemical Co., Ltd.; Kokusai Denshin Denwa Co., Ltd., both of Tokyo, Japan

[21] Appl. No.: 858,045

[22] Filed: Mar. 26, 1992

[30] Foreign Application Priority Data

Mar. 28, 1991 [JP] Japan .................................. 3-089744

[51] Int. Cl.$^5$ .............................................. C03B 8/04
[52] U.S. Cl. ...................... 65/18.2; 65/18.4; 65/60.51; 65/901; 65/60.5
[58] Field of Search .............. 65/18.2, 3.17, 60.8, 65/60.5, 60.51, 60.53, 18.3, 18.4, 901, 30.13

[56] References Cited

U.S. PATENT DOCUMENTS

| | | | |
|---|---|---|---|
| 5,047,076 | 9/1991 | Cognolato | 65/901 |
| 5,141,549 | 8/1992 | Tumminelli | 65/18.2 |
| 5,151,117 | 9/1992 | Bartholomew | 65/18.2 |

*Primary Examiner*—Karen M. Hastings
*Assistant Examiner*—John Hoffmann
*Attorney, Agent, or Firm*—McAulay Fisher Nissen Goldberg & Kiel

[57] ABSTRACT

A novel method is proposed for the preparation of a transparent fused silica glass body co-doped with a rare earth element and aluminum each in a high uniformity of the dopant distribution. The method comprises the steps of: (a) flame-hydrolyzing a silicon compound and an aluminum compound in an oxyhydrogen flame to form a porous silicon oxide body containing aluminum; (b) soaking the porous body having a specified bulk density with a solution of a rare earth compound; (c) drying the solution-soaked porous body; and (d) sintering and vitrifying the dried porous body into a transparent glass body.

7 Claims, 2 Drawing Sheets

METHOD FOR PREPARING A FUSED SILICA GLASS BODY CO-DOPED WITH A RARE EARTH ELEMENT AND ALUMINUM

BACKGROUND OF THE INVENTION

The present invention relates to a method for the preparation of a fused silica glass body co-doped with a rare earth element and aluminum. More particularly, the invention relates to a method for the preparation of a fused silica glass body doped with a rare earth element as the principal dopant and aluminum as a co-dopant and useful as a base material of optical fiber lasers and the like.

Fused silica glass doped with a rare earth element is used as a material of optical fiber lasers, light amplifiers, optical sensor elements and the like by utilizing the unique optical properties exhibited by the rare earth element as the dopant. It is also known that the optical performance of such fused silica glass doped with a rare earth element can be further improved when the glass is co-doped with aluminum. In an optical fiber of fused silica glass doped with erbium used in light amplifiers at a wavelength band of 1.55 μm in the optical communication system, for example, co-doping with aluminum has an effect to expand the wavelength region for amplification to give a possibility of simultaneously amplifying light signals transmitted at two or more different wavelengths.

Rare earth-doped fused silica glass can be prepared by the so-called MCVD method disclosed, for example, in Japanese Patent Kohyo 63-501711, according to which a chloride of the rare earth element is heated and vaporized at a high temperature and the vapor of the rare earth chloride is mixed with the vapor of a silicon compound and introduced into an oxyhydrogen flame in which the vapors are flame-hydrolyzed to be converted into the respective oxides to be deposited to form a porous glass body which is subsequently sintered and vitrified into a transparent glass body. A problem in this MCVD process is that difficulties are sometimes encountered in exactly controlling the feed rate of the rare earth chloride vapor relative to the vapor of the silicon compound due to the relatively low vapor pressure of the rare earth chloride, especially, when the doping level with the rare earth element should be very low, which is usually 500 ppm by weight or less, although this method may be applicable to a fused silica glass body doped with aluminum alone because of the relatively high vapor pressure of aluminum compounds as compared with rare earth compounds.

Alternatively, Japanese Patent Publication 58-3980 proposes a method for the preparation of a rare earth-doped fused silica glass body, according to which a silicon compound alone is subjected to flame-hydrolysis in an oxyhydrogen flame to produce fine particles of silica which are deposited to form a porous silica glass body and this porous body is then soaked and impregnated with a solution of a rare earth compound followed by drying and sintering to effect vitrification of the body into a transparent fused silica glass body. This method is indeed advantageous in the versatility that the method is applicable to any rare earth compounds having a relatively low vapor pressure irrespective of the doping level with the rare earth element.

The matter is not so simple, however, when this solution-impregnation method is applied to co-doping of a fused silica glass body with a rare earth element and aluminum, presumably, due to the difference in the affinity of the rare earth element and aluminum with the solvent of the solution and with the surface of silica forming the porous body. For example, the concentration of the aluminum compound is usually higher in the vicinity of the surface of the porous silica body than in the core portion due to the stronger adsorption of the aluminum compound than the rare earth compound and migration of the aluminum compound from the core portion to the surface layer by the capillary phenomenon in the course of drying. This problem is serious when the doping level with aluminum, which is usually in the range from 1000 to 10,000 ppm by weight, is so high that accumulation of the aluminum compound in the surface layer may cause inhibition of vitrification of the silica in that portion.

SUMMARY OF THE INVENTION

The present invention accordingly has an object to provide a novel and improved method for the preparation of a fused silica glass body co-doped with a rare earth element and aluminum without the above mentioned problems and disadvantages in the prior art methods relative to the control of the dopant concentrations of the both dopant elements throughout the glass body.

Thus, the method of the present invention for the preparation of a fused silica glass body co-doped with a rare earth element and aluminum comprises the successive steps of:

(a) introducing a silicon compound in the form of vapor and an aluminum compound in the form of vapor into an oxyhydrogen flame to effect co-pyrolysis of the silicon and aluminum compounds into the respective oxides in the form of particles which are deposited on a substrate in the form of a porous silicon oxide body containing aluminum oxide;

(b) soaking the porous body of silicon oxide containing aluminum oxide with a solution of a compound of a rare earth element to impregnate the porous body;

(c) drying the porous body of silicon oxide impregnated with the solution; and (d) heating the dried porous body of silicon oxide containing aluminum oxide and the rare earth compound at an elevated temperature to effect sintering and vitrification thereof into a transparent fused silica glass body co-doped with the rare earth element and aluminum.

DETAILED DESCRIPTION OF THE PREFERRED EMBODIMENTS

Figure 1:
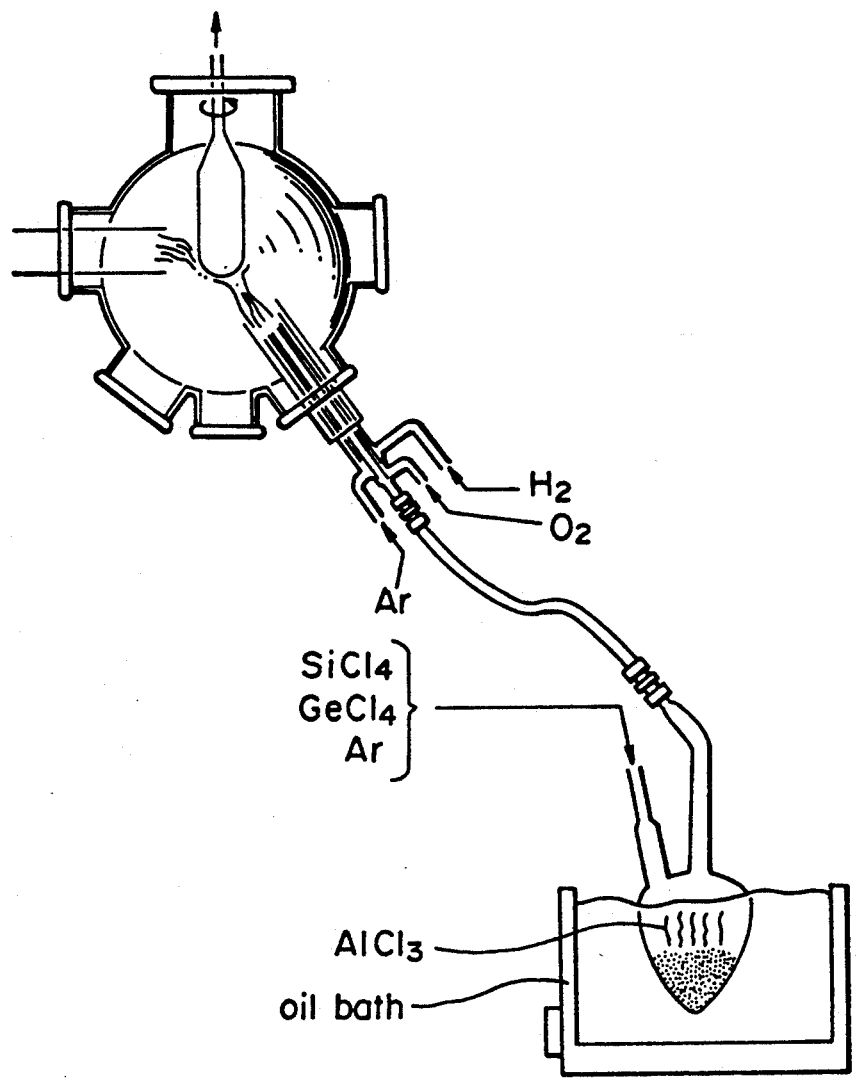
FIG. 1 is a schematic sketch of the apparatus for the flame hydrolysis of silicon and aluminum compounds used in the examples.

As is described above, the fused silica glass body obtained by the method of the invention is doped with aluminum through the MCVD process in which a silicon compound and an aluminum compound each in the form of vapor are jointly introduced into an oxyhydrogen flame where they are simultaneously flame-hydrolyzed into particles of the respective oxides which are deposited on a suitable substrate to form a porous body of silicon oxide uniformly containing aluminum oxide without the problem of localized accumulation of the aluminum compound in the vicinity of the surface layer. On the other hand, doping with the rare earth element is conducted by the solution-impregnation method according to which the rare earth compound can be uniformly distributed throughout the porous body even when the concentration of the rare earth compound in the solution is very low. Accordingly, very high uniformity can be ensured by the inventive method for the doping levels of both of the dopant elements. This method can obviate the disadvantage caused when the aluminum dopant is impregnated to the porous silicon oxide body by the solution-soaking method that the concentration level of aluminum is uneven and higher in the vicinity of the surface sometimes inhibiting vitrification of the porous body into a transparent glass body than in the core portion as well as the problem in connection with the control of uniform doping level with the rare earth element when the rare earth compound is introduced into the oxyhydrogen flame together with the silicon compound.

The porous silicon oxide body doped with aluminum can be prepared by a known method such as the so-called VAD method, OVD method and the like conventionally undertaken in the preparation of optical fiber preforms, in which vapors of a silicon compound and an aluminum compound are introduced into a high-temperature flame such as oxyhydrogen flame simultaneously or as a mixture so that they are converted into fine particles of the oxides to be deposited on a substrate body to give a porous silicon oxide body uniformly doped with aluminum. The aluminum compound is not particularly limitative provided that the compound can be easily vaporized. For example, aluminum chloride, aluminum bromide, aluminum trimethoxide, trimethyl aluminum and the like are preferred. It is of course optional according to need that the vapor mixture introduced into the oxyhydrogen flame is further admixed with a vapor of a compound of another dopant element such as germanium which is conventional as a dopant in optical fiber preforms for controlling the refractive index of the glass body. It is further optional that the distribution of such a dopant element for the control of the refractive index is varied within the cross section of the body by a technique well known in the art.

The porous silicon oxide body doped with aluminum and to be soaked with a solution of a rare earth compound is required to have a mechanical strength high enough not to be disintegrated when the body is soaked with a solution, for example, by dipping in the solution due to loss of the cohesion between silicon oxide particles. In this regard, the porous silicon oxide body desirably has a bulk density of at least 0.3 g/cm$^3$. When the porous silicon oxide body as prepared by the above mentioned method has a bulk density lower than this lower limit, it is preferable that the porous body is subjected to partial sintering prior to soaking with the solution so as to increase the bulk density of the porous body to exceed 0.3 g/cm$^3$. It should be noted, however, that the bulk density of the porous body should not exceed 1.0 g/cm$^3$ in order to ensure uniformity of soaking with the solution of a rare earth compound by the capillary phenomenon.

The kind of the rare earth element as the dopant naturally depends on the particular object of doping. Although the method of the present invention is applicable to any one or any combination of the rare earth elements including yttrium, the most frequently used elements as the dopant are neodymium, erbium, europium and cerium. The type of the rare earth compound is also not particularly limitative provided that the compound has an appropriate solubility in a solvent including water and organic solvents. Chlorides, nitrates and sulfates of the rare earth elements are used satisfactorily but chlorides are preferred in respect of their good availability and adequate solubility. The solvent used for the preparation of a solution of the rare earth compound is not particularly limitative but it is preferably an organic solvent such as methyl alcohol, ethyl alcohol and the like because these organic solvents are less active than water in respect of the decreasing effect on the cohesive force between the silicon oxide particles when the porous body is soaked with the solution in addition to the higher efficiency in drying subsequent to soaking of the porous body.

The porous silicon oxide body doped with aluminum and soaked with a solution of a rare earth compound is then dried, if ne-cessary, by heating or under reduced pressure and subjected to sintering and vitrification by heating at a high temperature of 1400° to 1500° C., preferably, in an atmosphere of an inert gas such as helium and the like. It is known that addition of a small amount of a halogen gas to the sintering atmosphere has an effect to promote decrease of the hydroxy groups in the silica glass body by the dehydration condensation. A small amount of oxygen gas can be admixed with the atmospheric gas for sintering so as to accelerate conversion of the rare earth compound into the oxide form.

In the following, the method of the invention is illustrated in more detail by way of examples.

EXAMPLE 1

By using an apparatus schemativally illustrated in FIG. 1, hydrogen gas and oxygen gas were introduced into the outer nozzles of a concentrical multiple-nozzle burner made from fused quartz glass to form an oxyhydrogen flame at rates of 4.0 liters/minute and 9.0 liters/minute, respectively. On the other hand, vapors of silicon tetrachloride and germanium tetrachloride as the glass-forming materials as carried by argon gas at rates of 0.205 liter/minute and 0.16 liter/minute, respectively, were blown into a vaporizer containing aluminum chloride heated at 130° C. on an oil bath so as to carry the vapor of aluminum chloride and then introduced into the oxyhydrogen flame through the center nozzle of the burner so as to be flame-hydrolyzed forming fine particles of mixed oxides of silicon and germanium doped with aluminum. The thus produced fine particles were deposited on the substrate body of fused silica glass for 5 hours to give a rod-formed porous silicon oxide body having a diameter of 60 mm, length of 260 mm, weight of 136 g and bulk density of 0.185 g/cm$^3$.

The thus obtained porous body was subjected to partial sintering by heating in an atmosphere of helium at a temperature of 1150° C. for 1.5 hours so that the bulk density of the porous body was increased to 0.6 g/cm$^3$.

In the next place, the partially sintered porous body was immersed in a methyl alcohol solution of erbium chloride in a concentration of 0.13% by weight and fully soaked with the solution. The porous body soaked with the solution was dried under a stream of air at room temperature and then subjected to a heat treatment to effect sintering and vitrification at a temperature of 1470° C. for 1 hour in an atmosphere of helium to give a transparent fused silica glass body having a diameter of 26 mm and a length of 80 mm. The average contents of erbium and aluminum therein were 90 ppm and 2800 ppm, respectively, for the radial direction as determined by the inductivity-coupled plasma atomic emission spectrophotometric method.

Figure 2:
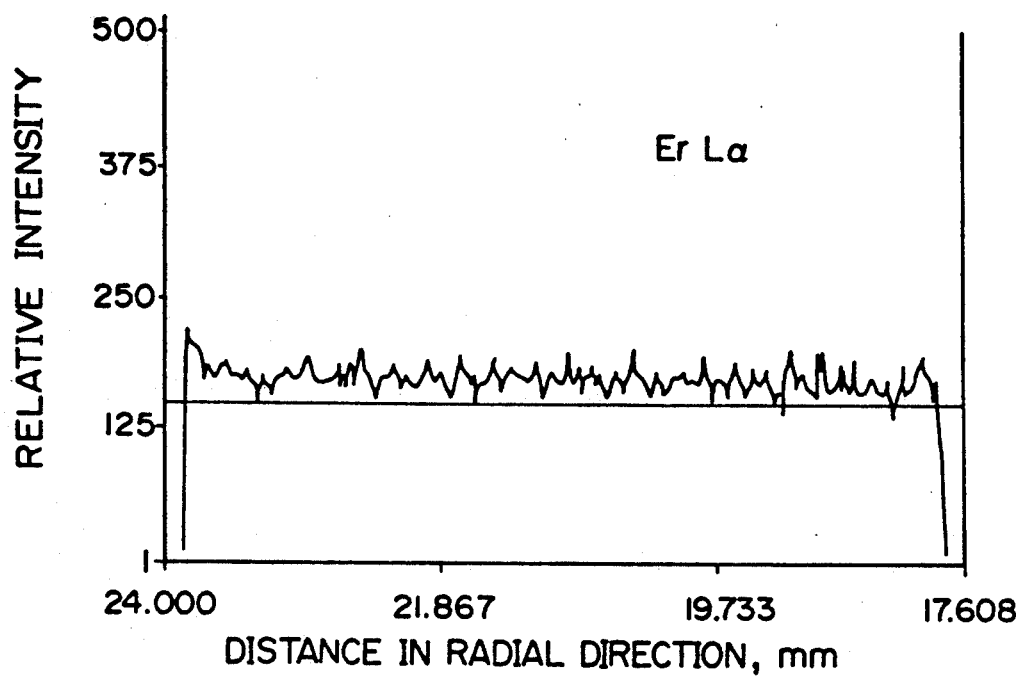
FIGS. 2 and 3 show the distribution of the concentration of erbium and aluminum, respectively, along the radial direction on a cross section of the fused silica glass body co-doped with erbium and aluminum and prepared in Example 1 as measured by the EPMA method.
Figure 3:
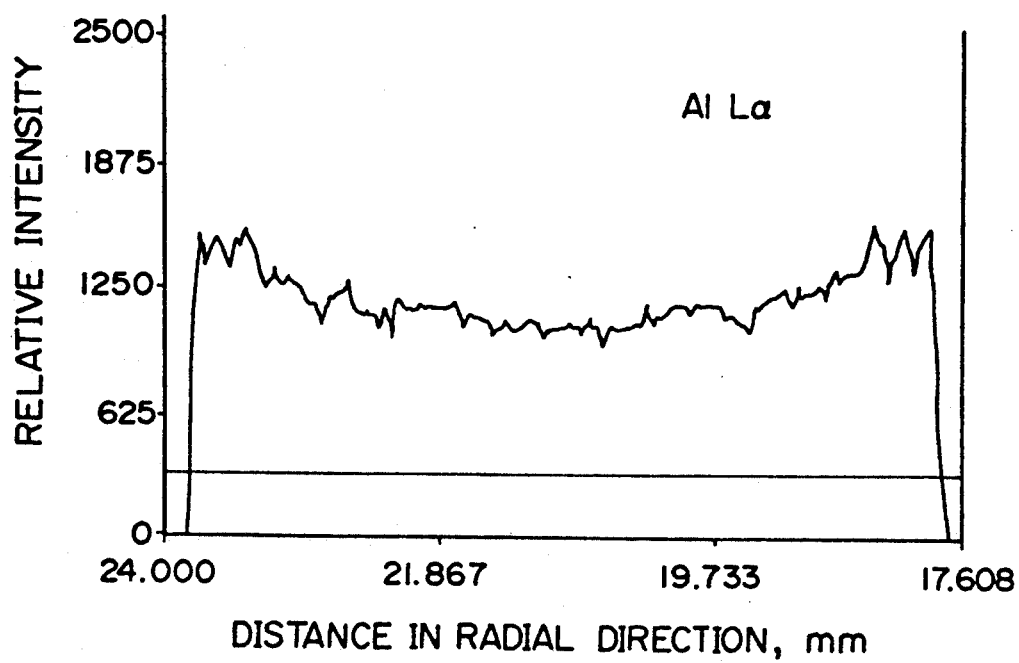

The glass rod body obtained above was cut perpendicularly to the axis and the cross section was examined by the EPMA method for the distribution of the concentrations of erbium and aluminum along the radial direction to give the results shown in FIGS. 2 and 3, respectively. These results indicate that the distribution of the erbium dopant was excellently uniform and a fairly good uniformity was obtained for the distribution of the aluminum dopant.

An optical fiber preform was prepared using the above obtained erbium- and aluminum-doped fused silica glass rod as the core which was provided with a cladding layer of fluorine-doped fused silica glass and the optical fibers prepared from the preform were subjected to the evaluation of the light amplification characteristics to find that excitation could be obtained with a pumping light of 20 mW output in a 1.4 $\mu$m band and the gain of amplification of the signal light at 1.55 $\mu$m wavelength was 30 dB.

EXAMPLE 2

A porous silicon oxide body doped with aluminum was prepared in substantially the same manner as in Example 1 except that the aluminum chloride in the vaporizer was heated at 150° C. instead of 130° C. The porous body had a diameter of 50 mm, length of 200 mm, weight of 90 g and bulk density of 0.23 g/cm$^3$.

The thus obtained porous body was subjected to partial sintering by heating in an atmosphere of helium at a temperature of 1150° C. for 1.3 hours so that the bulk density of the porous body was increased.

In the next place, the partially sintered porous body was immersed in a methyl alcohol solution of erbium chloride in a concentration of 0.12% by weight and fully soaked with the solution. The porous body soaked with the solution was dried under a stream of air at room temperature and then subjected to a heat treatment to effect sintering and vitrification at a temperature of 1470° C. for 1 hour in an atmosphere of helium to give a transparent fused silica glass body having a diameter of 22 mm and a length of 75 mm. The average contents of erbium and aluminum therein as the dopants were 145 ppm and 14,200 ppm, respectively, along the radial direction as determined by the same method as in Example 1.

Substantially the same results were obtained in the tests of the light amplification characteristics of optical fibers prepared from a preform having the above obtained erbium- and aluminum-doped fused silica glass body as the core provided with a cladding layer of fluorine-doped fused silica glass.

What is claimed is:

1. A method for the preparation of a fused silica glass body co-doped with a rare earth element and aluminum which comprises the successive steps of:
    (a) introducing a silicon compound in the form of vapor and an aluminum compound in the form of vapor into an oxyhydrogen flame to effect co-pyrolysis of the silicon and aluminum compounds into their respective oxides in the form of particles which are deposited on a substrate in the form of a porous silicon oxide body containing aluminum oxide;
    (b) soaking the porous body of silicon oxide containing aluminum oxide with a solution of a compound of a rare earth element in a solvent to impregnate the porous body;
    (c) drying the porous body of silicon oxide impregnated with the solution; and
    (d) heating the dried porous body of silicon oxide containing aluminum oxide and the rare earth compound at an elevated temperature to effect sintering and vitrification thereof into a transparent fused silica glass body co-doped with the rare earth element and aluminum.

2. The method for the preparation of a fused silica glass body co-doped with a rare earth element and aluminum as claimed in claim 1 in which the aluminum compound in step (a) is aluminum chloride.

3. The method for the preparation of a fused silica glass body co-doped with a rare earth element and aluminum as claimed in claim 1 in which the compound of a rare earth element is a chloride, nitrate or sulfate of the rare earth element.

4. The method for the preparation of a fused silica glass body co-doped with a rare earth element and aluminum as claimed in claim 3 in which the solvent in the solution is an organic solvent.

5. The method for the preparation of a fused silica glass body co-doped with a rare earth element and aluminum as claimed in claim 4 in which the organic solvent is methyl alcohol or ethyl alcohol.

6. The method for the preparation of a fused silica glass body co-doped with a rare earth element and aluminum as claimed in claim 1 in which the porous body of silicon oxide containing aluminum oxide prior to soaking with the solution in step (b) has a bulk density in the range from 0.3 to 1.0 g/cm$^3$.

7. The method for the preparation of a fused silica glass body co-doped with a rare earth element and aluminum as claimed in claim 1 in which the porous body of silicon oxide containing aluminum oxide obtained in step (a) is subjected, prior to step (b), to partial sintering so as to have a bulk density in the range from 0.3 to 1.0 g/cm$^3$.

* * * * *

UNITED STATES PATENT AND TRADEMARK OFFICE
CERTIFICATE OF CORRECTION

PATENT NO. : 5,246,475
DATED : September 21, 1993
INVENTOR(S) : Noboru Edagawa, et al It is certified that error appears in the above-indentified patent and that said Letters Patent is hereby corrected as shown below:

On the title page, Item [75]: 5th inventor should read
-- Tadakatsu Shimada, Gunma;

Signed and Sealed this

Twelfth Day of April, 1994

Attest:

BRUCE LEHMAN

*Attesting Officer*   *Commissioner of Patents and Trademarks*